United States Patent
Gablowski et al.

(10) Patent No.: US 11,557,229 B2
(45) Date of Patent: Jan. 17, 2023

(54) ACTIVATABLE ADHESIVE LABEL

(71) Applicant: HERMA GmbH, Filderstadt (DE)

(72) Inventors: Marcus Gablowski, Moessingen (DE); Ulli Naegele, Tuebingen (DE)

(73) Assignee: Herma GmbH, Filderstadt (DE)

( * ) Notice: Subject to any disclaimer, the term of this patent is extended or adjusted under 35 U.S.C. 154(b) by 0 days.

(21) Appl. No.: 16/608,036

(22) PCT Filed: Apr. 27, 2018

(86) PCT No.: PCT/EP2018/060942
§ 371 (c)(1),
(2) Date: Nov. 20, 2019

(87) PCT Pub. No.: WO2018/197697
PCT Pub. Date: Nov. 1, 2018

(65) Prior Publication Data
US 2020/0090554 A1  Mar. 19, 2020

(30) Foreign Application Priority Data
Apr. 27, 2017  (DE) .......................... 102017109074.6

(51) Int. Cl.
*G09F 3/10*    (2006.01)
*C09J 7/32*    (2018.01)
*G09F 3/02*    (2006.01)

(52) U.S. Cl.
CPC .................. *G09F 3/10* (2013.01); *C09J 7/32* (2018.01); *G09F 3/02* (2013.01); *C09J 2203/334* (2013.01); *C09J 2301/302* (2020.08); *C09J 2301/306* (2020.08); *C09J 2400/226* (2013.01); *C09J 2400/283* (2013.01); *G09F 2003/025* (2013.01); *G09F 2003/026* (2013.01); *G09F 2003/0229* (2013.01); *G09F 2003/0242* (2013.01); *Y10T 428/14* (2015.01)

(58) Field of Classification Search
CPC ........ G09F 3/10; G09F 3/02; G09F 2003/025; G09F 2003/026; G09F 2003/0242; G09F 2003/0229; C09J 7/32; C09J 2301/302; C09J 2301/306; C09J 2203/334; C09J 2400/283; C09J 2400/226; Y10T 428/14
See application file for complete search history.

(56) References Cited

U.S. PATENT DOCUMENTS

| | | | |
|---|---|---|---|
| 2014/0231006 A1 | 8/2014 | Tani et al. | |
| 2016/0186013 A1* | 6/2016 | Henderson | C09J 7/20 428/36.7 |

FOREIGN PATENT DOCUMENTS

| | | |
|---|---|---|
| CN | 101019162 A | 8/2007 |
| CN | 101429416 A | 5/2009 |
| CN | 102089476 A | 6/2011 |
| CN | 105492556 A | 4/2016 |
| CN | 105894866 A | 8/2016 |
| DE | 9218531 U1 | 6/1994 |
| DE | 69722043 T2 | 4/2004 |
| EP | 2924088 A1 | 9/2015 |
| WO | 2011/037732 A2 | 3/2011 |
| WO | 2015029049 A1 | 3/2015 |
| WO | 2016109199 A1 | 7/2016 |

OTHER PUBLICATIONS

Non-Translated German Examination Report for German Application 10 2017 109 074.6, filed Apr. 27, 2017.
International Search Report and Non-Translated Written Opinion Form PCT/IS/210 and PCT/ISA/237, International Applicaiton No. PCT/EP2018/060942, pp. 1-8, International Filing Date Apr. 27, 2018, dated search report Jul. 20, 2018.
Chinese Search Report, pp. 1-2.
Chinese Office Action, dated Nov. 3, 2021. pp. 1-8.

* cited by examiner

*Primary Examiner* — Patricia L. Nordmeyer
(74) *Attorney, Agent, or Firm* — Dilworth & Barrese, LLP

(57) ABSTRACT

The invention relates to an activatable adhesive label comprising a flexible web-shaped viewing material. At least one adhesive layer made of a moisture-activatable adhesive that is not adhesive in the dry state is applied onto one side of the flexible viewing material, wherein at least one central layer is provided which is designed to be adhesive and which is arranged between the viewing material and the adhesive layer.

19 Claims, No Drawings

ACTIVATABLE ADHESIVE LABEL

CROSS-REFERENCE TO RELATED APPLICATIONS

This application is a US national phase application of international patent application number PCT Application No.: PCT/EP2018/060942, filed on Apr. 27, 2018, which claims priority to German patent application No. 10 2017 109 074.6, filed Apr. 27, 2017, the disclosures of both of which are incorporated herein by reference in their entireties.

BACKGROUND

The present invention relates to an activatable adhesive label comprising a web-shaped viewing material, wherein at least one adhesive layer made of a moisture-activatable adhesive that is not adhesive in the dry state is applied onto one side of the flexible viewing material.

Such adhesive laminates (adhesive labels) are used, for example, as labels, but also as adhesive tapes, in particular for logistics applications, but also for conventional label applications for decorating, labeling and sealing.

Labels are usually made of a viewing material that is provided with a printing, as well as an adhesive layer.

Many of these labels also have a removable layer (e.g. siliconized liner) which covers the adhesive layer on the side facing away from the viewing material. This additional layer serves to prevent sticking of the labels, for example, if they are in roll form, with the closest layer of the viewing material. The disadvantage here is that the additional layer makes a further layer of material necessary and, moreover, this layer must be disposed of after removal from the adhesive layer. In particular, if automated labeling is provided, this additional layer poses additional problems and requirements for production.

Moreover, in the prior art there are labels in which a release coating is provided on the side of the viewing material facing away from the adhesive layer, which prevents the adhesive layer from being anchored to the viewing material in an adhesive manner. This increases costs and, moreover, such materials are not printable at will.

Furthermore, these systems, which provide a release coating on the side of the viewing material opposite the adhesive layer, are more difficult to process due to the permanent adhesiveness of the adhesive layer.

Therefore, there has long been a desire for activatable adhesive labels for labeling applications or as adhesive tapes which work as so-called "linerless systems," i.e. do not require a release layer on the adhesive layer and also no release coating on the side of the viewing material opposite the adhesive layer. Such systems are known, for example from stamps, etc., and have as adhesive layer an adhesive which is activatable. Suitable activating agents are, for example, moisture, but also radiation or heat.

Thus, for example, EP 2 924 088 A1 describes a so-called "liner-free" or "linerless" label and an adhesive composition for use therewith, wherein two different hydrophilic polymer materials are present in the adhesive composition, and the one provides a fast initial adhesion upon activation with a fluid if it comes in contact with the activating fluid, and the second, more hydrophobic polymer component then provides the final adhesion.

The setting of desired adhesive forces, in particular a fast initial adhesion, but also a permanent adhesion, therefore, continues to be a goal.

SUMMARY OF THE INVENTION

It is therefore an object of the invention to provide an alternative activatable adhesive label which is not adhesive in the dry state but can be converted by fluid action into an adhesive state, and in which a good adhesion between the viewing material and adhesive layer is ensured even in the wet state, and wherein a fast initial adhesion/"tack" can be provided.

The invention solves this problem by an activatable adhesive label, wherein at least one central layer is provided between the viewing material and adhesive layer, which is designed to be adhesive. This central layer performs two functions. Thus, on the one hand, it serves to improve the grip, i.e. the initial adhesion between a substrate and the adhesive label, while at the same time improving the final adhesion by means of a dissipative portion. In addition, the central layer reduces the risk of separation of adhesive layer and viewing material, in particular in the pasted or applied state.

In this case, the viewing material is preferably adjacent to the central layer without additional non-adhesive layers being provided therebetween. Alternatively or additionally, the adhesive layer is also immediately adjacent to the central layer.

It is particularly preferred if the viewing material consists of a paper material or a film material. In particular, polyethylene, polypropylene or PET films may be considered as the film material. The thickness of the film may preferably be 5 to 250 µm, preferably 10 to 200 µm, and more preferably 15 to 180 µm. The films are, in particular, films which can be printed using conventional printing processes. Paper may also be considered as a viewing material, in the case of using paper the thickness of the layer of viewing material being preferably 5 to 250 µm, preferably 15 to 200 µm and more preferably 40 to 100 µm. The papers are in particular also papers printable with conventional methods.

As an adhesive layer, materials are possible in particular which contain an adhesive (adhesive system) or an adhesive which is activatable by the action of moisture or water, i.e. water in the liquid or vapor state, to an adhesive state. That is, the adhesive layer is not sticky in the dry state and is activatable by adding water or water vapor, or alternatively another fluid in the liquid or vapor state, so that the adhesive layer is converted to an adhesive state. After evaporation of the fluid, then the adhesive layer is not sticky again. The fluid may optionally be temperature controlled in order to obtain a faster reaction time and thus a faster processability of the activatable adhesive label, i.e. adhesion to a substrate.

The thickness of the adhesive layer may preferably be 1 to 50 µm, more preferably 3 to 20 µm and more preferably 5 to 15 µm. The non-adhesive properties in the dry state are preferably present at room temperature.

The adhesive for the adhesive layer may preferably be selected from the group of polyvinyl acetates, ethylene vinyl acetates, glutinic and starch derivatives (dextrin), polyvinyl alcohols and combinations thereof.

In addition, the adhesive layer may contain additives, such as colloids, or other additives, such as surfactants, as well as crosslinking agents or the like.

The central layer may preferably be a layer which is formed between 1 and 30 µm, preferably between 2 and 20 µm and more preferably between 4 and 12 µm thick. The central layer also serves to improve the rheological properties of the activatable adhesive label and to provide a better bonding of the adhesive layer to a substrate to be bonded.

It is therefore particularly preferred if the glass transition temperature is below the application temperature, in particular in the range <0° C., preferably <−5° C., and more preferably <−10° C., wherein the lower limit is at −100° C., preferably at −80° C., and more preferably at −65° C., so that a preferred application range of the glass transition temperature between −10 and −65° C. results. The glass transition temperature of the polymers of the adhesives of the central layer can be determined by the customary methods, such as differential thermal analysis or differential scanning calorimetry, for example according to ASTM 3418/82, so-called "midpoint temperature."

The glass transition temperature thus gives an indication as to the property of the tack as well as the potential stickiness and the presence of an effective dissipative portion.

The measurable adhesion is >1 N, the measurement with 15 g/m$^2$ dry coating on polyester film being done with a thickness of 30 μm according to FTM 9 (FINAT Technical Handbook 9th Edition).

Suitable adhesives for the central layer are preferably systems which are adhesive at room temperature, such as free-radically polymerized polymers, polyesters or polyadducts, and polymers which are particularly preferably obtainable by emission polymerization. Conventional polymer compositions for acrylate dispersions are known, for example, from DE 2 459 160 A1, EP 0 625 557 B1 and EP 0 952 199, the disclosure of which in this regard is the subject of the present invention.

In addition, natural or synthetic rubber systems can also be used. Also, adhesive systems whose properties can be adjusted by photochemical crosslinking, for example by irradiation with electron beams or UV light. In particular, acRESIN® from BASF, Ludwigshafen, Germany, should be mentioned as preferred. In addition, other adhesives, in particular also Pressure Sensitive Adhesives (PSA), can be used.

In addition, silicone-based or polyurethane-based adhesive systems can also be used.

In this case, the central layer can contain, in addition to the adhesive polymer, further additives, in which case tackifying resins and so-called tackifier resins and reactive components, such as external crosslinkers, must be mentioned in particular. However, the central layer particularly preferably consists exclusively of one or more adhesive polymers, wherein it is also possible to use a plurality of adhesive polymers in combination. In principle, it is also conceivable to design the central layer with multiple plies. In this case, preferably all plies of the central layer are designed to be adhesive. In addition, the other layers, such as in particular the adhesive layer, and/or also the viewing material, can be designed to multi-ply, in particular for reasons of functionality or coatability. Preferably, the structure is three-layered with viewing material, central layer and adhesive layer, wherein the individual layers may be single- or multi-ply. In particular, no further layers are provided between the viewing material and the central layer as well as the central layer and the adhesive layer.

According to the invention, it is further provided that the activatable adhesive label can be fabricated in roll form as a linerless laminate. It can then be used as a type of adhesive tape or as a label (label blank) available in smaller units, wherein the fabrication to the desired size is done just before mounting on a substrate. In addition to such a roll-form fabrication, a stack-form fabrication is also possible. In this case, a punching or cutting takes place, for example, in the final size of the labels to be used or a cutting of the roll-shaped web material, wherein the activatable adhesive label can then be stored in stack form without additional intermediate layers for further processing.

Preferably, no adhesive repellent finish, e.g. by silicone, of the viewing material is provided or is it necessary. As a result, the selection of possible viewing materials can be increased and, for example, the printability can be improved.

Furthermore, it is particularly preferred that the adhesive layer is colored. This ensures that, when applied and activated, some of the dyes penetrate into a substrate to be bonded and discolor it. In a later attempt at manipulation by peeling off the adhesive label, either the substrate is then destroyed or else the discoloration of the adhered substrate becomes visible, which indicates that a label or an adhesive tape according to the invention has already been applied at this point.

The activatable adhesive label is obtainable by a coating method in which the central layer and the adhesive layer are present and coated as an aqueous dispersion, solution, melt or liquid 100% system. The coating of the central layer and the adhesive layer is preferably carried out in one operation.

For this purpose, a multi-cascade nozzle can be used. A coating method suitable for this purpose is previously known, for example, from U.S. Pat. No. 3,508,947, which in this respect is the subject of the present invention. The multilayer laminate (activatable adhesive label) is preferably produced by a method in which the at least two flowable compositions are continuously coated on a web-shaped substrate, preferably the viewing material. The coating is carried out using a multi-cascade nozzle. The coating speed is preferably 30 to 1500 m/min, more preferably 150 to 1200 m/min, and most preferably 300 to 1000 m/min.

The material layer for the central layer and the adhesive layer are separately fed as a liquid film into the coating device. An essential feature of the multi-cascade nozzle is that a complete film is formed from the individual films to be coated. In this complete film, the individual films are present in the spatial arrangement as desired later in the multi-layered laminate (adhesive label). The complete film is fed from the multi-cascade nozzle onto the moving web-shaped carrier. Preferably, the method is a slide coating method. In slide coating, the complete film slides over a surface, e.g. metal surface (sliding), and is then deposited on the substrate.

In a slot coating method, the complete film is by contrast fed directly from a slit or nozzle onto the substrate, i.e. without sliding.

It is also particularly preferably a curtain coating method. The curtain coating method deposits a free-falling film curtain on the substrate. In order for the film curtain to fall freely, the distance between the nozzle or other outlet opening and the moving substrate must be greater than the layer thickness to be coated. Particularly preferably, it is a slide coating method in combination with a curtain coating method.

However, the coating of central layer and adhesive layer, can alternatively also be applied in several work operations, e.g., one after the other. However, the application in one operation is preferred.

The multilayer adhesive laminate (activatable adhesive label) is suitable as a label or label blank, adhesive film or adhesive tape.

The overall structure of the adhesive label preferably has a thickness of 20 μm to 350 μm, preferably from 30 μm to 170 μm.

DETAILED DESCRIPTION

Particularly preferred here is an exemplary structure made of a paper material with a basis weight of 80 g/m² as a viewing material on which an adhesive V215 of BASF SE, Ludwigshafen, Germany was applied with a coating weight of 10 gsm (dry) as a central layer and an adhesive layer consisting of RW 26 (Planatol Wetzel GmbH, Rohrdorf, Germany) with a coating weight of 10 gsm (dry).

To clarify the difference between a structure with or without a central layer, experiments were carried out, wherein when a structure according to the above preferred example was used at different pressing periods, the immediate adhesion and the adhesion after 60 seconds was determined. This was compared to a reference example in which only an adhesive layer of 20 gsm made of RW 26 (Planatol Wetzel GmbH, Rohrdorf, Germany) was used, so that the total thickness remained constant on the viewing layer. A packaging board (corrugated board) was used as the substrate to be bonded. The result is shown in the table below.

| Adhesive structure (number of layers) | Coating weight | Pressing time/ seconds | Immediate adhesion | Adhesion after 60 seconds |
|---|---|---|---|---|
| RW26 (1) | 20 gsm | 1 | + | +++/FR |
| RW26 (1) | 20 gsm | 0.3 | 0 | -- |
| V215/RW26 (2) | 10/10 gsm | 1 | ++ | FR |
| V215/RW26 (2) | 10/10 gsm | 0.3 | ++ | FR |
| V215/RW26 (2) | 10/10 gsm | 0.15 | + | FR |

+ Tack or adhesion present
++ Clear tack/adhesion
+++ Very good tack/adhesion
FR fiber break It can be clearly seen here that the use of a two-layer adhesive label construction significantly improves the adhesion, both the immediately occurring adhesion and the adhesion after 60 seconds, to the point of tearing out of fibers from the substrate. This can also be achieved even in the case of a significantly reduced pressing period, so that a secure adhesion of labels can be achieved despite greater labeling speed.

By providing the central layer, the grip can be improved by a factor of >4 compared to an identical adhesive layer. If in the case of the two-layer structure, namely only one adhesive layer, about 1 second of pressing time is required in the labeling, about 0.15 seconds are sufficient in the structure according to the invention.

In addition, the central layer increases the final adhesion via a dissipative portion, so that there is hardly any flaking of the label.

Such activatable adhesive labels are preferably used as logistics labels or logistics adhesive tapes as well as for typical labels or adhesive tape applications for decorating, marking or sealing. In particular, they can serve as a replacement for prefabricated wet glue applications, e.g. in bottles, cans, or other containers, in which the labels are prefabricated as a label stack.

The invention claimed is:

1. An activatable adhesive label comprising a flexible web-shaped viewing material, wherein at least one outer adhesive layer made of a moisture-activatable adhesive that is not adhesive in the dry state is applied onto one side of the flexible viewing material, at least one central layer having a glass transition temperature and an application temperature is provided which is designed to be adhesive and which is arranged between the viewing material and the outer adhesive layer, the glass transition temperature is lower than the application temperature and the central layer is configured to reduce the risk of separation of the outer adhesive layer and the viewing material in the pasted or applied state, and the outer adhesive layer is non-sticky in dry state, activatable by fluid to convert to an adhesive state, and non-sticky after removal of the fluid.

2. The activatable adhesive label according to claim 1, wherein the viewing material comprises a film or a paper and is designed to be printable.

3. The activatable adhesive label according to claim 1, wherein the viewing material is paper and has a thickness of 5-250 microns.

4. The activatable adhesive label according to claim 1, wherein the central layer comprises adhesives which are adhesive at room temperature.

5. The activatable adhesive label according to claim 1, wherein the adhesive of the adhesive layer is activatable by water or water vapor.

6. The activatable adhesive label according to claim 1, wherein the side of the viewing material opposite the central layer is not configured to be adhesive-repellent.

7. The activatable adhesive label according to claim 1, wherein the activatable adhesive label can be fabricated as a linerless adhesive label.

8. The activatable adhesive label according to claim 1, wherein the adhesive layer is colored.

9. The activatable adhesive label according to claim 1, wherein the activatable adhesive label can be produced with a multi-cascade nozzle by coating the central layer and the adhesive layer on the viewing material in one method step.

10. The activatable adhesive label according to claim 1, wherein the activatable adhesive label can be applied to the viewing material by coating the central layer and the adhesive layer in a curtain coating method.

11. The activatable adhesive label according to claim 1, wherein the adhesive layer has a thickness of 15 to 50 microns.

12. The activatable adhesive label according to claim 1, wherein the adhesive layer has a coating weight of about 10 g/m².

13. The activatable adhesive label according to claim 1, wherein the outer adhesive layer is permanently adherable to a substrate.

14. The activatable adhesive label according to claim 13, wherein the outer adhesive layer is permanently adherable to the substrate after 60 seconds following application.

15. The activatable adhesive label according to claim 1, wherein both the viewing material and outer adhesive are immediately adjacent the central layer on opposite sides thereof.

16. A Label blank comprising an activatable adhesive label comprising a flexible web-shaped viewing material, wherein at least one outer adhesive layer made of a moisture-activatable adhesive not adhesive in the dry state is located on one side of the flexible viewing material, at least one central layer having a glass transition temperature and an application temperature is provided which is designed to be adhesive and is arranged between the viewing material and the outer adhesive layer, the glass transition temperature is lower than the application temperature and the central layer is configured to reduce risk of separation of the outer adhesive layer and the viewing material in the pasted or applied state, and the outer adhesive layer is non-sticky in dry state, activatable by fluid to convert to an adhesive state, and non-sticky after removal of the fluid.

17. The label blank according to claim 16, wherein the outer adhesive layer is permanently adherable to a substrate.

18. The label blank according to claim 17, wherein the outer adhesive layer is permanently adherable to the substrate after 60 seconds following application.

19. The label blank according to claim 16, wherein both the viewing material and outer adhesive are immediately adjacent the central layer on opposite sides thereof.

* * * * *